United States Patent [19]

Valenzona

[11] Patent Number: 4,778,965
[45] Date of Patent: Oct. 18, 1988

[54] SWITCH CONSTRUCTION WITH INTEGRAL MOUNTING CLIPS

[75] Inventor: Joseph Valenzona, Cerritos, Calif.

[73] Assignee: Judco Manufacturing Company, Harbor City, Calif.

[21] Appl. No.: 129,932

[22] Filed: Dec. 3, 1987

Related U.S. Application Data

[63] Continuation of Ser. No. 909,168, Sep. 19, 1986, abandoned.

[51] Int. Cl.$^4$ .............................................. H01H 9/00
[52] U.S. Cl. ................................ 200/296; 439/554; 200/292; 200/295; 200/284
[58] Field of Search ............... 439/554; 200/292, 284, 200/295, 296, 293

[56] References Cited

U.S. PATENT DOCUMENTS

| | | | |
|---|---|---|---|
| 2,742,627 | 4/1956 | Lazzery et al. | 339/128 X |
| 3,476,900 | 11/1969 | Sharples | 200/292 X |
| 3,592,983 | 7/1971 | Kroll et al. | 200/292 X |
| 3,701,870 | 10/1972 | Serenson | 200/295 |
| 4,276,460 | 6/1981 | Haesly et al. | 200/292 |
| 4,461,938 | 9/1984 | Sorenson | 200/296 |

FOREIGN PATENT DOCUMENTS

| | | | |
|---|---|---|---|
| 2720724 | 11/1978 | Fed. Rep. of Germany | 200/296 |
| 2098804 | 11/1982 | United Kingdom | 200/295 |

*Primary Examiner*—Henry J. Recla
*Assistant Examiner*—Ernest G. Cusick
*Attorney, Agent, or Firm*—Fulwider, Patton, Rieber, Lee & Utecht

[57] ABSTRACT

An electrical switch mounting structure includes a housing for the switch, terminals on the exterior of the housing, a substrate incorporating an opening into which the housing is inserted, conductive elements on the base which contact the terminals upon insertion of the housing, and elastic mounting members which both retain the housing in the base and assure contact between the terminals and the conductive elements.

7 Claims, 1 Drawing Sheet

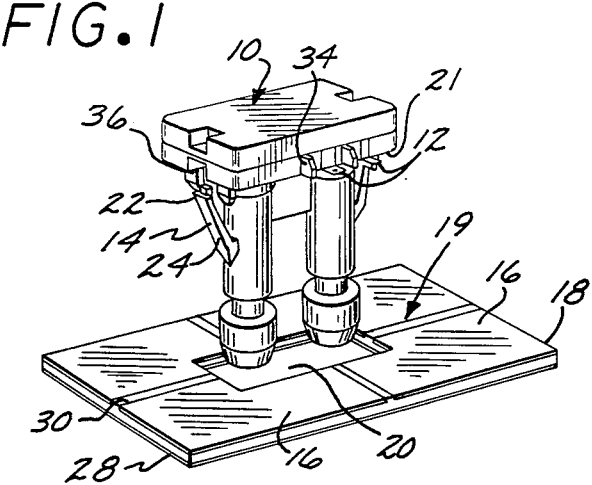
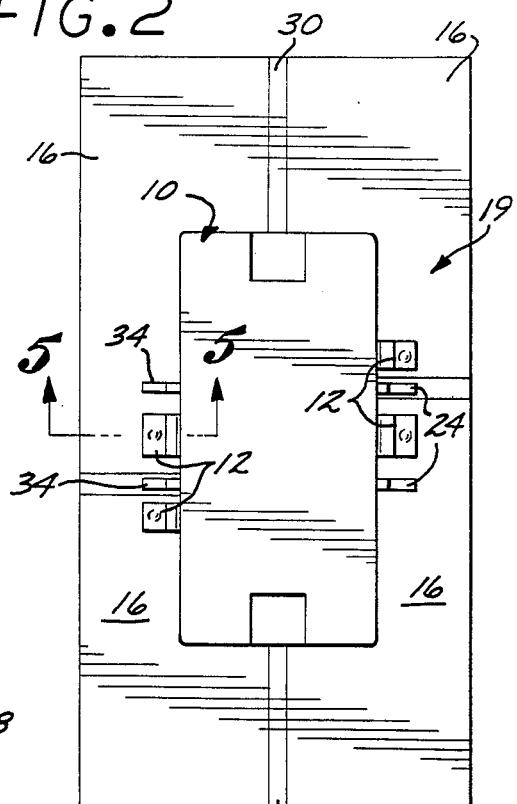
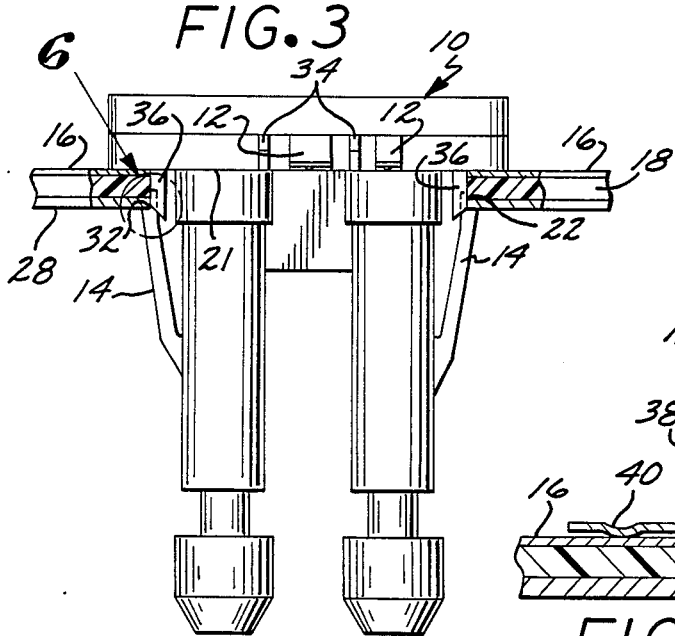
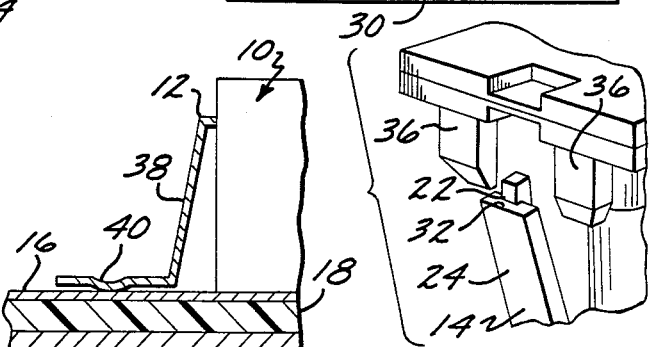
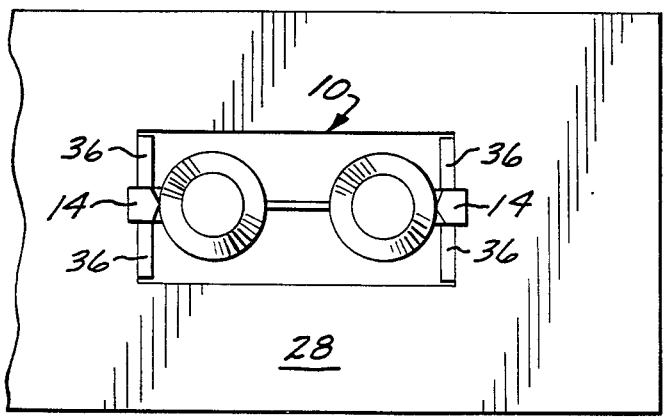
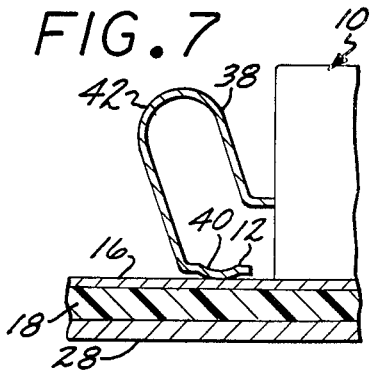

SWITCH CONSTRUCTION WITH INTEGRAL MOUNTING CLIPS

This is a continuation of application Ser. No. 909,168, filed 9-19-86, now abandoned.

BACKGROUND OF THE INVENTION

This invention relates to electrical switches or other electrical components and, more particularly, to the means of connecting such components to the circuits to which they interface. While electrical switches have been used for a variety of purposes and have taken many forms, the means used to connect them to external electrical circuits have been limited. Previously used connections have included the use of soldered, welded or crimped terminals and other connectors such as threaded fasteners which are used to complete the conductive path between the terminals of the component and the external circuit. In each of these methods of connection, the means used to connect the switch to an external circuit involves a substantial number of parts and significant manual labor and/or manufacturing steps associated with the connection process. When this multiplicity of manufacturing steps, connecting components and labor is added to the mounting labor and components, it can be seen that the installation of the switch in most subassemblies utilizing them represents significant cost and complexity in the manufacturing process.

With the increased automation of manufacturing processes and high cost of skilled labor, it has become very desirable to develop components and assemblies which can be simply and reliably assembled by machines or unskilled labor in a relatively small number of operations. As described above, the current systems for connecting switches to external circuits and mounting the switches in subassemblies do not readily lend themselves to this type of automated process, so there is a need for an economical, simple, easily assembled mounting and connection system for switches.

SUMMARY OF THE INVENTION

The present invention provides substantial improvements over present switch assembly concepts and provides solutions to all of the problems noted above related to switch mounting and connection systems which have been previously available. The invention provides simple and reliable onestep installation and connection for a wide variety of switch types, including those which are actuated by external means and which may incorporate multiple actuation subassemblies.

The invention provides this advantageous capability by incorporating into the switch housing both the terminals to connect to an external circuit and a switch mounting concept providing positive retention of the switch mount in a substrate and a means of positively urging contact between the terminals on the switch mount and conductive means built into the substrate. The invention accomplishes these desirable effects by advantageously using a unique configuration of resilient switch body mounting arms. This configuration, in combination with a compatible opening in the substrate, positively retains the switch after insertion. Once installation is completed, the resilient switch body mounting arms urge the switch body in the direction of insertion, thereby bringing terminals incorporated into the base of the switch housing in contact with a conductive printed circuit on the substrate. The printed circuit is configured to correspond to the configuration of the terminals and is on the side of the substrate facing the terminals. The terminals are formed to provide a contact area in a relatively small footprint of the terminal, thereby increasing the contact pressure and precisely locating the area to which the printed circuit formed on the substrate must conform.

It can be readily seen that the configuration of the various components of the invention may take a variety of forms, including various shapes of openings into which the switch body is to be inserted, various arrangements and configurations of terminals and various types of elastic arms formed into the housing of the switch, which satisfy the requirement to both positively retain the switch and urge the switch axially in the direction of insertion during the mounting process. Naturally, the actual configuration of each of these components may be altered to best suit the purposes for which the switch and its connections are adapted.

While the above is intended as a description of the invention, other advantages to the invention will be apparent to those skilled in the art and they may adapt the invention to various purposes as the utility of the invention becomes known to them. Therefore, the above description should not be considered limiting and should only be considered in light of this specification and the appended claims.

BRIEF DESCRIPTION OF THE DRAWINGS

FIG. 1 is a perspective view of a switch assembly and substrate employing the invention shown prior to installation of the switch in the substrate.

FIG. 2 is a plan view of the switch body inserted in the substrate viewed from the base of the switch body showing the relationship of the terminals, the switch body and the conductive layer on the substrate.

FIG. 3 is a cross section of a system employing the invention with the switch body mounted in the substrate.

FIG. 4 is a view of a system employing the invention taken vertically in the direction of actuation of the pair of push-to-actuate switches.

FIG. 5 is a cross section at 5 of FIG. 2 showing the detail of the inner face between the substrate and the terminals on the switch body.

FIG. 6 is a perspective detail of the end of the cantilevered arm which contacts the substrate.

FIG. 7 is a cross section of an alternative configuration of the terminals and substrate useful for contact with a narrower conductive area on the substrate.

DESCRIPTION OF THE PREFERRED EMBODIMENT

As shown in the exemplary drawings, referring first to FIG. 1, the present invention is embodied in a switch body 10 having terminals 12 and elastic mounting means 14 designed to urge terminal 12 contact with a conductive portion 16 on substrate 18 after insertion of switch body 10 through opening 20 in substrate 18, the elastic mounting means 14 further retaining the switch body external mounting surface 19 against substrate 18.

Elastic mounting means 14 are designed to perform two functions: 1) to positively lock external mounting surface 19 of switch body 10 against substrate 18 once it has been inserted through opening 20, and 2) to thereafter positively urge terminals 12 against conductive portion 16 of the substrate. Conductive portion 16 may advantageously be made by deposition or forming a metal layer in a selected pattern on said substrates by any of a variety of well known processes such as photo etching. These functions are accomplished by constructing elastic members 14 as cantilevered curved beams eminating from the switch body 10 in such a way that they are progressively deflected as switch body 10 is inserted in opening 20 in substrate 18 until terminals 12 are brought in contact with conductive surface 16. The length of elastic members 14 are designed to that notch 22 is reached as switch body 10 reaches its mounted position, thereafter snapping back to their extended positions. In that position, detent 32 of cantilevered arm 24 provides constant tension against surface 28 of the substrate 18, thereby urging terminals 12 against the conductive portion 16 of the substrate.

Referring to FIG. 2, installed switch body 10, after insertion into substrate 18 is viewed from the conductive side 16 of substrate 18. Conductive layer 16, details of terminals 12 and the configuration of conductive portions and nonconductive portion 30 of substrate 18 on external mounting surface 19 are illustrated. While a single configuration of the combination of terminals and conductive pattern is shown, those skilled in the art will see a variety of arrangements of terminals, insulative elements and conductive elements which would be useful for various purposes. In FIG. 2 a symmetrical configuration is illustrated so that the switch may be inserted in either one of two ways and still provide the proper connections. Such a configuration is very useful when the switches are to be automatically inserted and it is not desirable to use special equipment to orient the switches prior to insertion. The configuration illustrated also employs insulated lugs 34 which serve to protect the terminals during handling and also provide addtiional bearing area for stability once the switch is inserted.

FIG. 3 illustrates a cross section of the installed switch showing a detail of the elastic mounting members 14. In this illustration, switch body 10 has been fully inserted into opening 20 and cantilever arms 24 have snapped into their mounted positions after insertion through hole 20 as the switch body was inserted. Detents 32 thereafter come in positive contact with the face 28 of substrate 18 opposite the conductive portion 16 of external mounting surface 19 thereby urging switch terminals 12 and stabilizing lugs 34 axially against conductive surface 16, thereby completing contact between the terminals and the conductive portion of the substrate. Elastic mounting elements 14 may take a number of forms depending upon the geometry of switch body 10 and the opening 20. In order to further stabilize the switch once it is installed, lugs 36 are formed into the base of switch 10 to prevent rotation about the invention axis after installation is completed.

FIG. 4 illustrates a view axially along the center line of the switch, after installation, looking in the direction of the substrate opposite the conducting layer. Here, elastic mounting elements 14 have returned to their extended position once the switch has been inserted, thereby preventing the switch from being withdrawn through opening 20.

FIG. 5 illustrates a detail of the terminals 12 on switch body 10 wherein the elastic terminal element 38 causes constant tension of the terminal against conductive layer 16. The dimple 40 formed in the terminal provides both contact with the conductive layer 16 and prevents jamming of the terminal into the conductive layer due to the relative low friction of the dimple against the conductive layer (caused by the smoothness of the spherical dimple formed) compared to an unfinished planar terminal. The dimple further enhances reliable contact due to the relatively high pressure exerted by the dimple against the conductive layer compared to lugs of larger area (e.g., planar surfaces) using the same elastic portion of the terminal 38.

FIG. 6 illustrates a perspective detail of the elastic mounting means 14 and stabilizing lug 36. As can be seen from this illustration, the purpose of stabilizing lugs 36 is to flank the elastic members 14, thereby providing a means to prevent rotational action of the switch within opening 20 once it has been inserted. This is useful when lugs 34 are only configured to prevent movement in an axial direction after insertion in order to enhance their terminal function.

FIG. 7 illustrates a cross section of an alternative arrangement of the terminal 12 designed to allow contact with a narrowed conductive area on the substrate compared to the configuration of FIG. 1. This configuration also has the benefit of providing a variable range of contact pressure due to the various configurations in which terminal 12 can be formed. For example, the radius of loop 42 and the thickness or widths of terminal 12 may be altered, thereby changing the spring rate and therefore the pressure exerted by dimple 40 against conductive surface 16.

From the foregoing it will be appreciated that the switch mounting and connection system of the invention provides a useful and improved means of mounting and connecting electrial switches, especially those which must be inserted by machine or with relatively low skilled labor and for which a minimum number of parts and operations associated with the insertion and connection is desirable. While the invention has been illustrated as a means of mounting and connecting switches, it will be appreciated that the concept is readily adaptable to various other electronic or electromechanical devices which require the same simple insertion and connection means and which can advantageously use the benefits of the present invention.

While several forms of the invention have been illustrated and described, it will also be apparent that various modifications can be made without departing from the spirit and scope of the invention. Accordingly, it is not intended that the invention be limited except by the appended claims.

I claim:

1. In a combination of a switch mounting device and a substrate having an electrically conductive surface, an electrically non-conductive portion, and an opening for receiving the switch mounting device in an installed position, the switch mounting device comprising:

an electrical switch body including means for mounting an electrical switch;

a plurality of electrical terminals projecting from said switch body adapted to contact said substrate electrically conductive surface when said switch mounting device is received in said opening in said installed position;

a plurality of elastic mounting members adapted to be inserted through said substrate opening, each mounting member projecting in an extended position from said switch body and adapted to be deflected by said opening during insertion and to return to said extended position projecting from said switch body to press against said substrate when said mounting device is received in said opening in said installed position, to thereby retain said mounting device in said installed position and urge said terminals into electrical contact with said substrate electrically conductive surface; and a plurality of stabilizing lug members projecting from said switch body adapted to press against said substrate conductive surface when said mounting device is received in said opening in said installed position, whereby said elastic mounting members and said lugs cooperate to stabilize said mounting device in said opening against movement in said installed position from forces transmitted to said mounting device by said means for mounting an electrical switch.

2. The combination of claim 1, wherein said plurality of lug members comprises at least one first lug adjacent said plurality of terminals adapted to protect said terminals during handling.

3. The combination of claim 2, wherein said plurality of lug members further comprises at least one second lug adapted to resist rotational movement of said mounting device within said opening when said mounting device is in said installed position.

4. The combination of claim 1, wherein said plurality of terminals project symmetrically from said switch body, whereby said switch mounting device may be received in said opening.

5. The combination of claim 1, wherein at least one of said lugs is insulated.

6. An electrical switch mounting construction comprising:

an electrical switch housing, said housing including means to mount an electrical switch;

terminals on the exterior of said housing;

a nonconductive substrate, said substrate including an opening to receive said housing, a first surface and a second surface;

a conductive surface formed on said second surface, said conductive surface and said terminals being in electrical contact when said housing is inserted through said opening in said substrate;

a plurality of elastic mounting members on said housing, said elastic members both retaining said housing in said substrate after insertion and urging said terminals against said conductive surface, thereby providing electrical contact and mechanical mounting of said housing in said substrate; and a plurality of lugs disposed on said housing so as to contact said substrate second surface when said housing is inserted through said opening in said substrate, whereby said elastic mounting members and said lugs cooperate to prevent movement of said housing in said opening when said housing is inserted through said opening.

7. A switch mounting system with integral mounting clips comprising:

a switch housing, said housing having a longitudinal axis and an external mounting surface consisting of a shoulder perpendicular to the longitudinal axis of said housing;

conductive elements terminating in conductive terminals on said external mounting surface;

a mounting substrate, said mounting substrate having a first and a second surface, said substrate containing an opening to receive said housing, said substrate having formed upon said second surface a conductive pattern;

elastic mounting means on said housing to urge said terminals on said housing against said conductive pattern so as to advantageously make electrical connectin between said terminals and said conductive pattern; and a plurality of lugs on said housing external mounting surface adapted to contact said substrate second surface when said housing is received in said opening, whereby said elastic mounting means and said lugs cooperate to substantially prevent movement of said housing within said opening when said housing is received in said opening.

* * * * *